United States Patent
Chun et al.

(10) Patent No.: US 11,451,699 B2
(45) Date of Patent: Sep. 20, 2022

(54) DEVICE FOR CORRECTING AND COMPRESSING IMAGE ERROR DATA, AND METHOD RELATED THERETO

(71) Applicant: Samsung Electronics Co., Ltd., Gyeonggi-do (KR)

(72) Inventors: Hyung Ju Chun, Gyeonggi-do (KR); Jin Min Bang, Gyeonggi-do (KR); A Rang Lee, Gyeonggi-do (KR); Jong Bum Choi, Gyeonggi-do (KR); Sung Oh Kim, Gyeonggi-do (KR); Young Jo Kim, Gyeonggi-do (KR); Hyun Hee Park, Seoul (KR); Ha Joong Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 16/631,943

(22) PCT Filed: Apr. 2, 2018

(86) PCT No.: PCT/KR2018/003850
§ 371 (c)(1),
(2) Date: Jan. 17, 2020

(87) PCT Pub. No.: WO2019/017562
PCT Pub. Date: Jan. 24, 2019

(65) Prior Publication Data
US 2020/0228700 A1 Jul. 16, 2020

(30) Foreign Application Priority Data
Jul. 20, 2017 (KR) .................. 10-2017-0091868

(51) Int. Cl.
H04N 5/225 (2006.01)
H04N 5/232 (2006.01)
(Continued)

(52) U.S. Cl.
CPC ..... *H04N 5/23206* (2013.01); *G06F 11/0772* (2013.01); *G06T 3/40* (2013.01);
(Continued)

(58) Field of Classification Search
CPC .. H04N 5/23206; H04N 5/23229; H04N 1/32; H04N 5/217; H04N 5/232;
(Continued)

(56) References Cited

U.S. PATENT DOCUMENTS 5,977,991 A * 11/1999 DeGoricija ............ G09G 5/395
345/536
7,768,567 B2 8/2010 Azuma
(Continued)

FOREIGN PATENT DOCUMENTS

JP 2006-26234 A 2/2006
JP 2006-345053 A 12/2006
(Continued)

*Primary Examiner* — Stephen P Coleman
(74) *Attorney, Agent, or Firm* — Cha & Reiter, LLC

(57) ABSTRACT

An electronic device includes a processor, and an image sensor module, wherein the image sensor module may include an image sensor, and a control circuit electrically connected to the image sensor and connected to the processor through an interface, and wherein the control circuit may obtain raw image data through the image sensor, sense at least one pixel data included in the raw image data and at least one error data based on a difference between pixel values of the at least one pixel data and each of at least one other pixel data adjacent to the at least one pixel data, generate attribute information corresponding to the at least one error data, correct the at least one error data based on a specified scheme, compress the raw image data in which the at least one error data are corrected, and transmit the compressed raw image data and the attribute information to the processor.

14 Claims, 11 Drawing Sheets

(51) Int. Cl.
*G06F 11/07* (2006.01)
*G06T 3/40* (2006.01)
*G06T 7/00* (2017.01)
*G06T 9/00* (2006.01)

(52) U.S. Cl.
CPC .............. *G06T 7/0002* (2013.01); *G06T 9/00* (2013.01); *G06T 2207/20224* (2013.01)

(58) Field of Classification Search
CPC ............ H04N 19/85; H04N 1/41; H04N 5/77; H04N 5/9261; G06F 11/0772; G06F 11/0733; G06F 11/0793; G06T 3/40; G06T 7/0002; G06T 9/00; G06T 2207/20224
USPC ................................................... 348/207.99
See application file for complete search history.

(56) References Cited

U.S. PATENT DOCUMENTS

| | | |
|---|---|---|
| 7,920,200 B2 | 4/2011 | Azuma |
| 8,013,910 B2 | 9/2011 | Kato et al. |
| 8,259,198 B2 | 9/2012 | Cote et al. |
| 9,635,289 B2 | 4/2017 | Kano |
| 10,382,749 B2 | 8/2019 | Seregin et al. |
| 10,419,774 B2 | 9/2019 | Laroche et al. |
| 2005/0162531 A1* | 7/2005 | Hsu ........................ H04N 5/367 348/222.1 |
| 2005/0196032 A1* | 9/2005 | Nedivi .................... G06T 7/001 382/149 |
| 2005/0253054 A1* | 11/2005 | Guarino ............. G01D 5/24476 250/231.14 |
| 2006/0017826 A1 | 1/2006 | Sekimoto et al. |
| 2006/0274170 A1 | 12/2006 | Azuma |
| 2008/0122925 A1 | 5/2008 | Sekimoto et al. |
| 2008/0129845 A1 | 6/2008 | Azuma |
| 2008/0129846 A1 | 6/2008 | Azuma |
| 2008/0136943 A1 | 6/2008 | Azuma |
| 2008/0291295 A1 | 11/2008 | Kato et al. |
| 2011/0090371 A1* | 4/2011 | Cote .................... H04N 5/2176 348/237 |
| 2011/0125998 A1* | 5/2011 | Jeon .................... H04L 63/0428 713/150 |
| 2013/0198483 A1* | 8/2013 | Tagami .............. H04N 1/32448 711/171 |
| 2015/0195462 A1 | 7/2015 | Kano |
| 2015/0341635 A1* | 11/2015 | Seregin ................. H04N 19/70 375/240.16 |
| 2016/0309177 A1 | 10/2016 | Laroche et al. |

FOREIGN PATENT DOCUMENTS

| | | |
|---|---|---|
| KR | 10-2012-0062940 A | 6/2012 |
| KR | 10-2012-0068665 A | 6/2012 |
| KR | 10-2014-0112371 A | 9/2014 |
| KR | 10-2017-0008816 A | 1/2017 |
| WO | 2015/086717 A2 | 6/2015 |

* cited by examiner

810

| EG-0 | | | | |
|---|---|---|---|---|
| Prefix | Suffix | Value Range | Max value | Num of Bit |
| 0 | | 0 | 0 | 1 |
| 10 | X | 2 | 2 | 3 |
| 110 | XX | 4 | 6 | 5 |
| 1110 | XXX | 8 | 14 | 7 |
| 11110 | XXXX | 16 | 30 | 9 |
| 111110 | XXXXX | 32 | 62 | 11 |
| 1111110 | XXXXXX | 64 | 126 | 13 |
| 11111110 | XXXXXXX | 128 | 254 | 15 |
| 111111110 | XXXXXXXX | 256 | 510 | 17 |
| 1111111110 | XXXXXXXXX | 512 | 1022 | 19 |
| 11111111110 | XXXXXXXXXX | 1024 | 2046 | 21 |
| 111111111110 | XXXXXXXXXXX | 2048 | 4094 | 23 |
| 1111111111110 | XXXXXXXXXXXX | 4096 | 8190 | 25 |

830

| Value | Bin String |
|---|---|
| 0 | 0 |
| 1 | 10 |
| 2 | 110 |
| 3 | 1110 |
| 4 | 11110 |
| 5 | 1111100 |
| 6 | 1111101 |

820

| EG-2 | | | | |
|---|---|---|---|---|
| Prefix | Suffix | Value Range | Max value | Num of Bit |
| 0 | XX | 4 | 3 | 3 |
| 10 | XXX | 8 | 11 | 5 |
| 110 | XXXX | 16 | 27 | 7 |
| 1110 | XXXXX | 32 | 59 | 9 |
| 11110 | XXXXXX | 64 | 123 | 11 |
| 111110 | XXXXXXX | 128 | 251 | 13 |
| 1111110 | XXXXXXXX | 256 | 507 | 15 |
| 11111110 | XXXXXXXXX | 512 | 1019 | 17 |
| 111111110 | XXXXXXXXXX | 1024 | 2043 | 19 |
| 1111111110 | XXXXXXXXXXX | 2048 | 4091 | 21 |
| 11111111110 | XXXXXXXXXXXX | 4096 | 8187 | 23 |
| 111111111110 | XXXXXXXXXXXXX | 8192 | 16379 | 25 |
| 1111111111110 | XXXXXXXXXXXXXX | 16384 | 32763 | 27 |

FIG.8

DEVICE FOR CORRECTING AND COMPRESSING IMAGE ERROR DATA, AND METHOD RELATED THERETO

CLAIM OF PRIORITY

This application is a National Phase Entry of PCT International Application No. PCT/KR2018/003850, which was filed on Apr. 2, 2018, and claims a priority to Korean Patent Application No. 10-2017-0091868, which was filed on Jul. 20, 2017, the contents of which are incorporated herein by reference.

TECHNICAL FIELD

The disclosure relates to a technique for supporting image data compression.

BACKGROUND ART

An electronic device may obtain image data of an object through an image sensor such as a camera. The image sensor may transfer the obtained image data to the processor of the electronic device through the interface.

DISCLOSURE

Technical Problem

To address the increased memory requirements, increased hardware costs, and increased transmission bandwidth caused by high resolution image demands, an image sensor can compress the obtained image data and transfer the compressed image data to a processor. When error data (or defect pixels) are generated in the image data, the compression rate of the image data may be reduced by the generated error data.

An aspect of the disclosure is to provide an electronic device capable of improving the compression rate of image data by correcting error data included in the image data, and a method related thereto.

Technical Solution

In accordance with an aspect of the disclosure, an electronic device includes a processor, and an image sensor module, wherein the image sensor module may include an image sensor, and a control circuit electrically connected to the image sensor and connected to the processor through an interface, and wherein the control circuit may obtain raw image data through the image sensor, sense at least one pixel data included in the raw image data and at least one error data based on a difference between pixel values of the at least one pixel data and each of at least one other pixel data adjacent to the at least one pixel data, generate attribute information corresponding to the at least one error data, correct the at least one error data based on a specified scheme, compress the raw image data in which the at least one error data are corrected, and transmit the compressed raw image data and the attribute information to the processor.

In accordance with another aspect of the disclosure, an image sensor module includes an image sensor that generates image data corresponding to light reflected or generated from a subject, a correction circuit that senses at least one pixel data included in the image data and at least one error data based on a difference between pixel values of he at least one pixel data and each of at least one other pixel data adjacent to the at least one pixel data, and corrects the at least one error data based on a specified scheme, an encoder that compresses the image data in which the at least one error data are corrected, and a transmitter that transmits the compressed image data to a processor connected to the image sensor module through an interface.

In accordance with still another aspect of the disclosure, a processor may be configured to receive raw image data including error data corrected by a control circuit and compressed by the control circuit, and attribute information corresponding to the error data from the control circuit connected to the processor through an interface, and restore the compressed raw image data and the error data, where the error data are restored based on the attribute information and corrected in a specified correction scheme.

Advantageous Effects

According to the embodiment of the disclosure, the electronic device may correct error data included in image data, thereby providing an improved image data compression rate According to the embodiment of the disclosure, the electronic device may restore image data by using the attribute information corresponding to error data, thereby providing the user with high resolution image data.

In addition, various effects that are directly or indirectly understood through the present disclosure may be provided.

DESCRIPTION OF DRAWINGS

FIG. 8 is a view illustrating a method of binarizing a run value according to various embodiments;

MODE FOR INVENTION

Various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the present invention.

Figure 1:
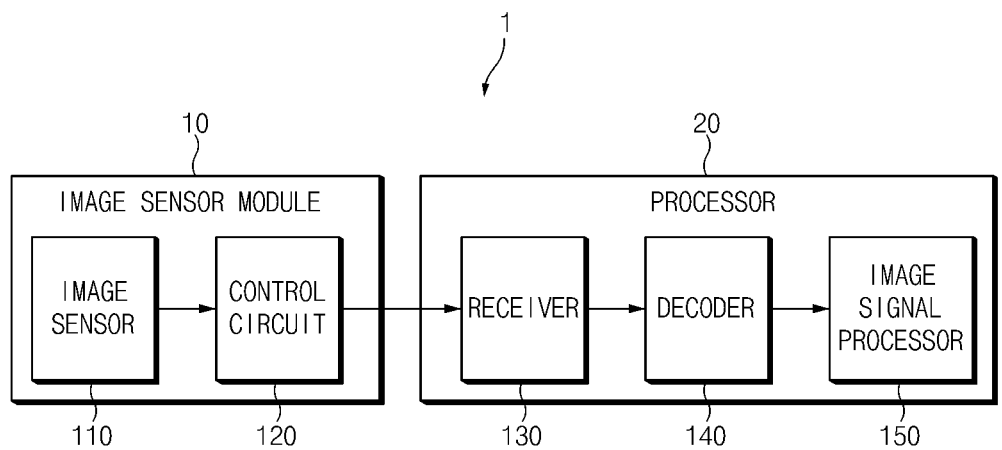
FIG. 1 is a block diagram illustrating an electronic device for correcting error data of an image and compressing a corrected image according to various embodiments.

FIG. 1 is a block diagram illustrating an electronic device for correcting error data of an image and compressing a corrected image according to various embodiments.

Referring to FIG. 1, an electronic device 1 may include an image sensor module 10 and a processor 20. According to various embodiments, the electronic device 1 may be implemented by omitting some components or may further include a configuration not shown. For example, the electronic device 1 may further include a display, a memory, and/or a communication module.

According to an embodiment, the image sensor module 10 may capture a still image and a video. The image sensor module 10 may include an image sensor 110 and a control circuit 120. According to various embodiments, the image sensor module 10 may be implemented by omitting some components or may further include a configuration not shown. For example, the image sensor module 10 may further include a lens, an iris, an infrared blocking filter, and an optical image stabilization (OIS) driving module.

According to an embodiment, the processor 20 may operate an overall function of the electronic device 1. For example, the processor 20 may process the image data obtained from the image sensor module 10, and control a display included in the electronic device 1 to display a still image or a video of a subject by using the processed image data. As another example, the processor 20 may store the processed image data in a memory of the electronic device 1. As still another example, the processor 20 may control a communication module included in the electronic device 1 to transmit the processed image data to another electronic device or a server. The processor 20 may include at least one of an application processor (AP) and an image signal processor (ISP).

According to an embodiment, the image sensor module 10 and the processor 20 may be connected through an interface. For example, the image sensor module 10 may transfer image data to the processor 20 by using a D-PHY and/or C-PHY interface defined in a mobile industry processor interface (MIPI).

According to an embodiment, the image sensor 110 may be implemented by using a charge-coupled device (CCD) or a complementary metal-oxide-semiconductor (CMOS). The image sensor 110 may include a pixel array in which a plurality of pixels are two-dimensionally arranged. The pixel array may include a plurality of pixel data.

According to an embodiment, the image sensor 110 may generate raw image data corresponding to light reflected or generated from a subject. In response to the received light, the image sensor 110 may generate an electrical signal (e.g., charge movement or current) that is the basis of the image data. The raw image data obtained through the image sensor 110 may be transferred to the processor 20 through the control circuit 120.

According to an embodiment, the control circuit 120 may perform a series of operations for processing the image data generated by the image sensor 110. For example, the control circuit 120 may sense at least one error data (or a defect pixel) included in the raw image data, and correct the sensed at least one error data based on a specified scheme. As another example, the control circuit 120 may compress the raw image data in which the at least one error data is corrected, and transmit the compressed raw image data to a receiver 130 included in the processor 20 in the form of a bit stream. As still another example, the control circuit 120 may generate attribute information corresponding to the sensed error data and transmit the generated attribute information to the processor 20 or the receiver 130. As still another example, the control circuit 120 may compress the generated attribute information and transmit the compressed attribute information to the processor 20 or the receiver 130. By correcting the error data through the control circuit 120 before the electronic device 1 compresses the raw image data, the electronic device 1 may prevent the compression rate of the image sensor module 10 from being lowered.

According to an embodiment, the receiver 130 may receive the compressed raw image data and/or attribute information transmitted from the image sensor module 10 (or the control circuit 120). When the attribute information generated by the control circuit 120 is compressed, the receiver 130 may receive the compressed attribute information from the control circuit 120.

According to an embodiment, a decoder 140 may reconstruct the compressed raw image data received from the receiver 130. The decoder 140 may restore the error data corrected by the control circuit 120 based on the attribute information. When the attribute information is compressed by the control circuit 120, the decoder 140 may restore the compressed attribute information. According to various embodiments, the decoder 140 may be a separate module or may be included in an image signal processor (ISP) 150.

According to an embodiment, the ISP 150 may process the restored raw image data in a specified scheme. The ISP 150 may include at least one image processing (IP) block configured to process the restored raw image data. For example, at least one IP block may be an IP block for color interpolation, lens shading correction, auto white balance, lateral chromatic aberration correction, optical inverse correction, noise reduction, edge enhancement, gamma correction, or out-of-focusing or blurring. According to various embodiments, the ISP 150 may be included in the processor 20 or may be a dedicated module.

According to an embodiment, the ISP 150 may correct error data included in the restored raw image data, based on the attribute information. The ISP 150 may correct the error data by using the correction scheme which is the same as or at least partially different from that performed by the control circuit 120. The electronic device 1 may improve the compression rate of the image sensor module 10 by correcting the error data through the control circuit 120, and at the same time, perform additional correction through the ISP 150 to provide improved image quality.

Figure 2:
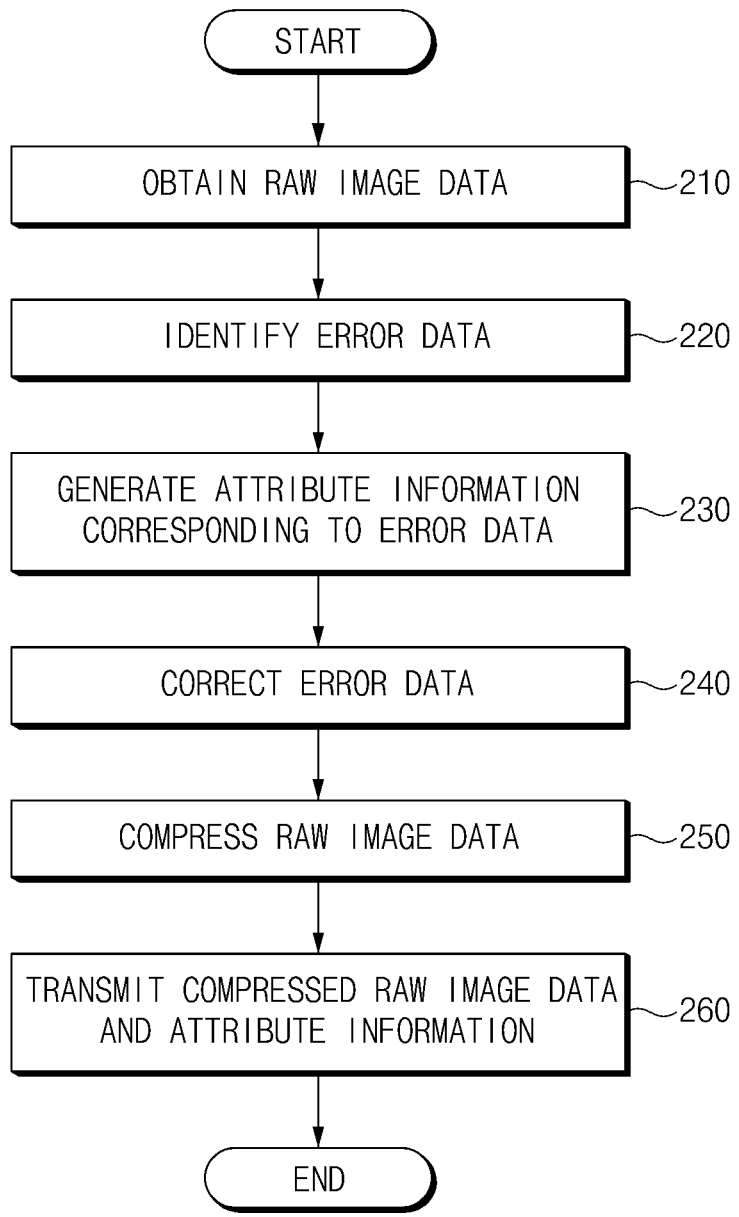
FIG. 2 is a flowchart illustrating an operation of a control circuit for compressing image data according to various embodiments.

FIG. 2 is a flowchart illustrating an operation of a control circuit for compressing image data according to various embodiments. The operations illustrated in FIG. 2 may be performed by a control circuit (e.g., the control circuit 120) or an image sensor module (e.g., the image sensor module 10).

Figure 3:
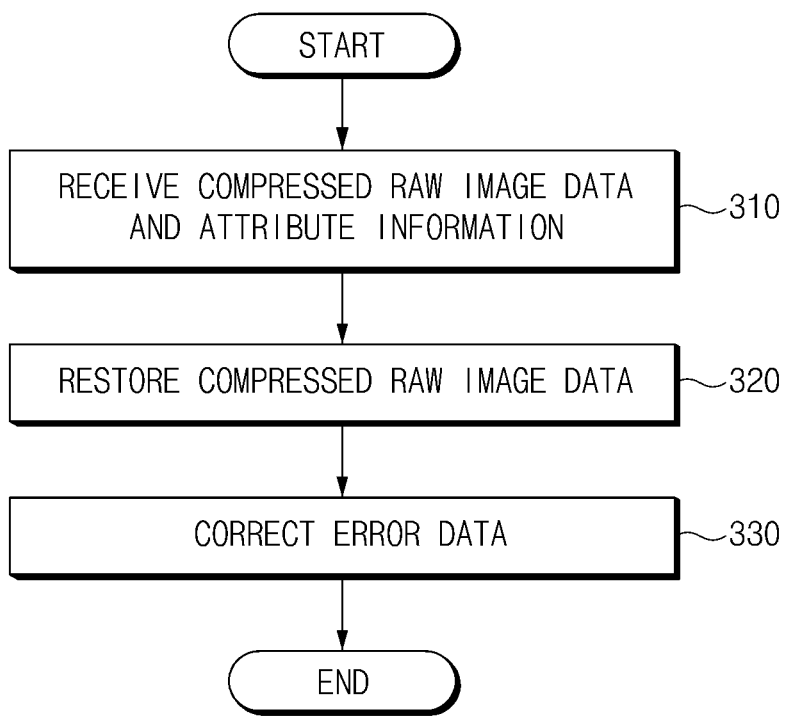
FIG. 3 is a flowchart illustrating an operation of a processor for restoring image data according to various embodiments.

Referring to FIG. 2, in operation 210, a control circuit (e.g., the control circuit 120) may obtain raw image data corresponding to light reflected or generated from a subject. The raw image data may include various patterns. Various image data patterns included in the raw image data are illustrated in FIG. 3.

In operation 220, the control circuit may sense at least one error data based on a difference between pixel values of adjacent pixel data among the plurality of pixel data included in the obtained raw image data. For example, the control circuit may sense specific pixel data as the error data by comparing the difference between the pixel values of specific pixel data included in the raw image data and the pixel values of other adjacent pixel data with a specified reference value. As another example, the control circuit may determine specific pixel data as error data by comparing the difference between the pixel value of the specific pixel data and the pixel value of the adjacent pixel data with the difference between the pixel values of other adjacent pixel data.

In operation 230, the control circuit may generate attribute information corresponding to the sensed error data. The attribute information may include, for example, at least one error data and a bit value of each of the plurality of adjacent pixel data. The attribute information may include flag data (e.g., bit values) for indicating error data.

In operation 240, the control circuit may correct the sensed error data based on a specified scheme. For example, the control circuit may replace the pixel value of the error data with the average of the pixel values of each of the pixel data adjacent to the error data. As another example, the control circuit may replace the pixel value of the error data with the pixel value average of two pixel data having the smallest mutual difference between pixel values among the pixel data adjacent to the error data.

In operation 250, the control circuit may compress the raw image data in which the error data are corrected. Although not shown in FIG. 2, depending on the implementation method, the control circuit may compress not only the raw image data but also the attribute information.

In operation 260, the control circuit may transmit the compressed raw image data and/or attribute information to a processor (e.g., the processor 20) or a receiver (e.g., receiver 130) included in the processor. The control circuit may transmit the compressed raw image data and/or attribute information in the form of a bit stream. Although not shown in FIG. 2, depending on an implementation method, the control circuit may transmit not only uncompressed attribute information but also compressed attribute information. The control circuit may transmit the compressed image data and attribute information through the MIPI interface.

The operations illustrated in FIG. 2 may be modified according to various embodiments disclosed in the disclosure, and the order of the operations may be changed. In addition, the operations are not necessarily to be performed continuously, and each operation may be performed at the same time. For example, after sensing error data in operation 220, the control circuit may correct the error data without generating attribute information (operation 240). In this case, the control circuit may transmit only the compressed raw image data to the processor in operation 260.

FIG. 3 is a flowchart illustrating an operation of a processor for restoring image data according to various embodiments.

Referring to FIG. 3, in operation 310, a processor (e.g., the processor 20) may receive compressed raw image data and attribute information from a control circuit (e.g., the control circuit 120). The processor may receive the compressed raw image data and attribute information through the MIPI interface. The compressed raw image data may include error data corrected by the control circuit. The attribute information may correspond to the error data. For example, the attribute information may include flag data corresponding to the location of the error data.

In operation 320, the processor may restore the compressed raw image data. As a part of the operation of restoring the compressed raw image data, the processor may restore the error data based on the attribute information.

In operation 330, the processor may correct the restored error data in a specified correction scheme. The processor may perform the same correction scheme as the correction scheme performed by the control circuit, and may perform the correction scheme at least partially different from the correction scheme performed by the control circuit.

The operations illustrated in FIG. 3 may be modified according to various embodiments disclosed in the disclosure, and the order of the operations may be changed. In addition, the operations are not necessarily to be performed continuously, and the operations may be performed at the same time. For example, in addition to operations 310 to 330, the processor may receive the compressed attribute information from the control circuit. The processor may restore the compressed attribute information and restore and correct the error data based on the restored attribute information.

Figure 4:
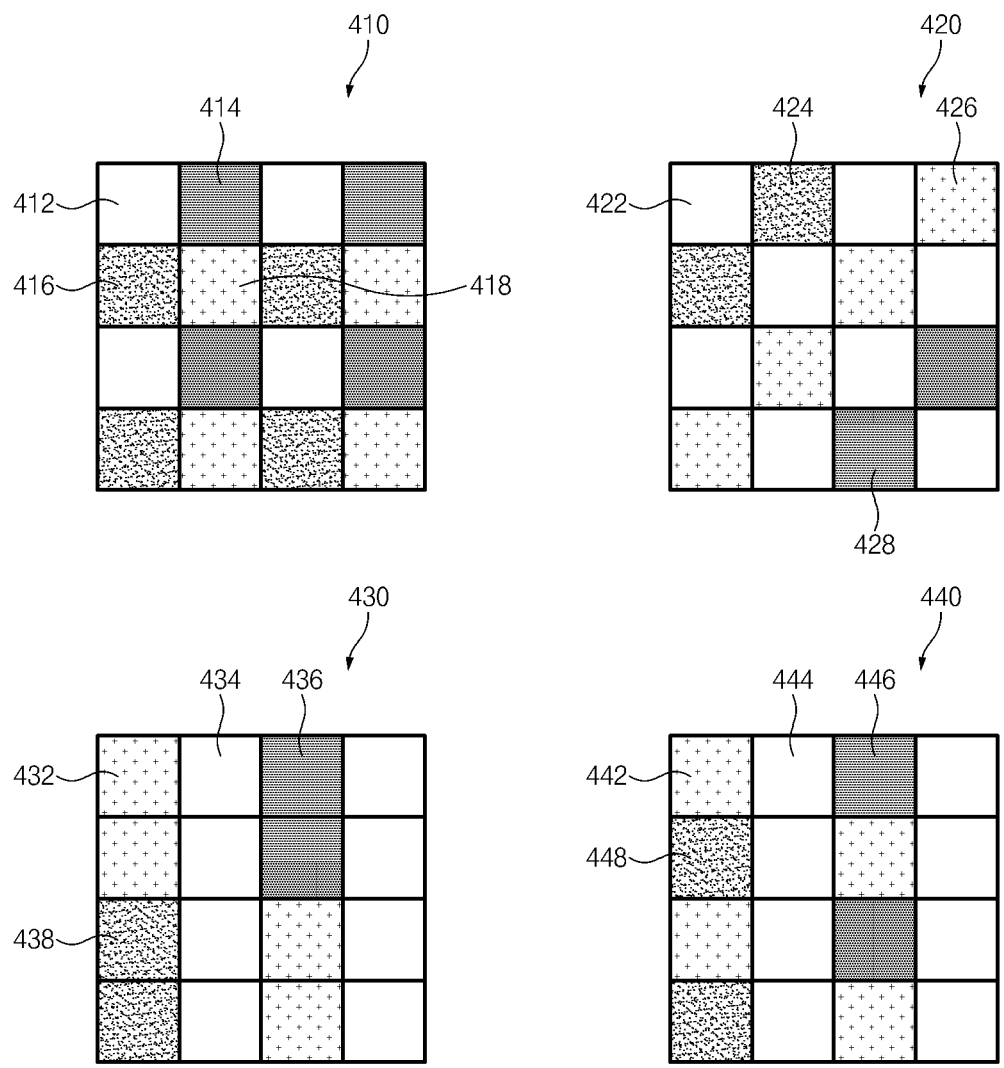
FIG. 4 is a view illustrating a pattern of image data according to various embodiments.

FIG. 4 is a view illustrating a pattern of image data according to various embodiments.

Referring to FIG. 4, the raw image data obtained through the image sensor 110 may include image data 410, image data 420, image data 430, or image data 440. Each pattern of the image data 410 to 440 may be determined corresponding to characteristics (e.g., a wavelength range of light passing through the filter) of the plurality of filters included in the image sensor 110.

Each of the image data 410 to 440 may include different image data patterns according to each color (e.g., red, green, blue, emerald, cyan, yellow, magenta and white) represented by the unit pixels 412 to 418, 422 to 428, 432 to 438, and 442 to 448 included in each of the image data 410 to 440. For example, the image data 410 may have a bayer pattern, a red green blue emerald (RGBE) pattern, a cyan yellow yellow magenta (CYYM) pattern, a cyan yellow green magenta (CYGM) pattern, and a red green blue white (RGBW) pattern. As another example, the image data 420 may be an RGBE #1 pattern. As still another example, the image data 430 may be an RGBW #2 pattern. As still another example, the image data 440 may be an RGBW #3 pattern.

Figure 5:
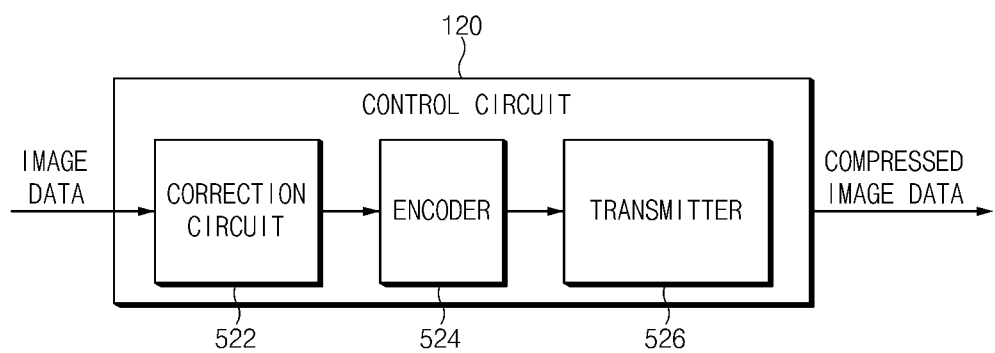
FIG. 5 is a block diagram illustrating a control circuit according to various embodiments.

FIG. 5 is a block diagram illustrating a control circuit according to various embodiments.

Referring to FIG. 5, the control circuit 120 may include components that perform the function of the control circuit 120 described in FIGS. 1 and 2. The control circuit 120 may include a correction circuit 522, an encoder 524, and a transmitter 526.

According to an embodiment, the correction circuit 522 is arranged in front of the encoder 524 to sense and correct error data before the image data obtained from an image sensor (e.g., the image sensor 110) are compressed. The correction circuit 522 may sense the error data based on a difference between pixel values of the plurality of pixel data included in the image data. The correction circuit 522 may correct the sensed error data based on a specified scheme. The correction circuit 522 may generate attribute information corresponding to the sensed error data. The attribute information may include, for example, at least one error data and a bit value of the plurality of pixel data. According to various embodiments, the correction circuit 522 may transfer the attribute information to the encoder 524 to compress the generated attribute information, and may directly transfer the attribute information to the processor 20 through the transmitter 526. In addition, according to various embodiments, the correction circuit 522 may transmit only the image data whose error data is corrected to the encoder 524 without generating the attribute information, and transmit both the corrected image data and the attribute information to the encoder 524. According to various embodiments, the correction circuit 522 may be a dedicated module or may be included in the encoder 524.

According to an embodiment, the encoder 524 may compress image data in which error data is corrected. In addition to the corrected image data, the encoder 524 may compress the attribute information generated by the correction circuit 522. The encoder 524 may compress the attribute information corresponding to various compression schemes.

According to an embodiment, the transmitter 526 may transmit the compressed image data to the receiver 130 included in the processor 20. The transmitter 526 may transmit the compressed image data by using, for example, the D-PHY and/or C-PHY interface defined by MIPI. When the attribute information generated by the correction circuit 522 is compressed by the encoder 524, the transmitter 526 may transmit the compressed attribute information to the receiver 130. When the attribute information is directly transferred from the correction circuit 522 to the transmitter 526, the transmitter 526 may transmit the uncompressed attribute information to the receiver 130.

Figure 6:
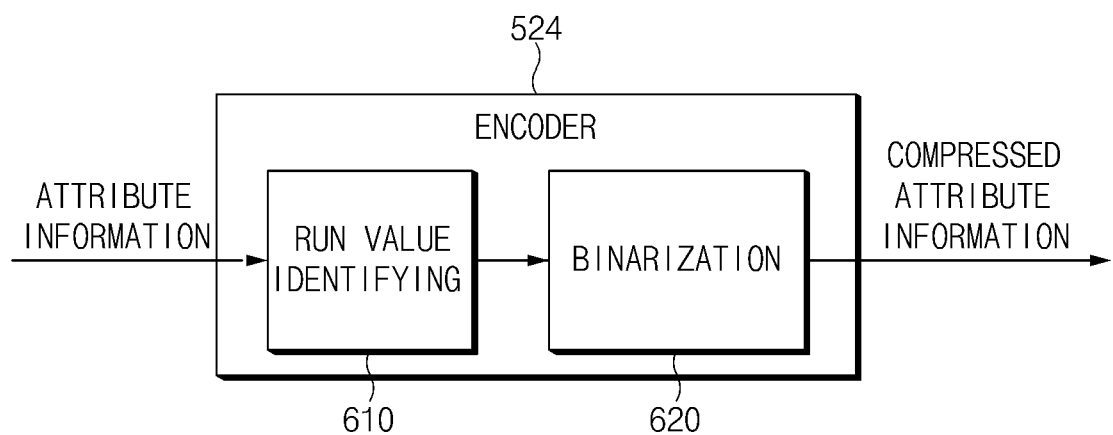
FIG. 6 is a block diagram illustrating an encoder according to various embodiments.
Figure 7:
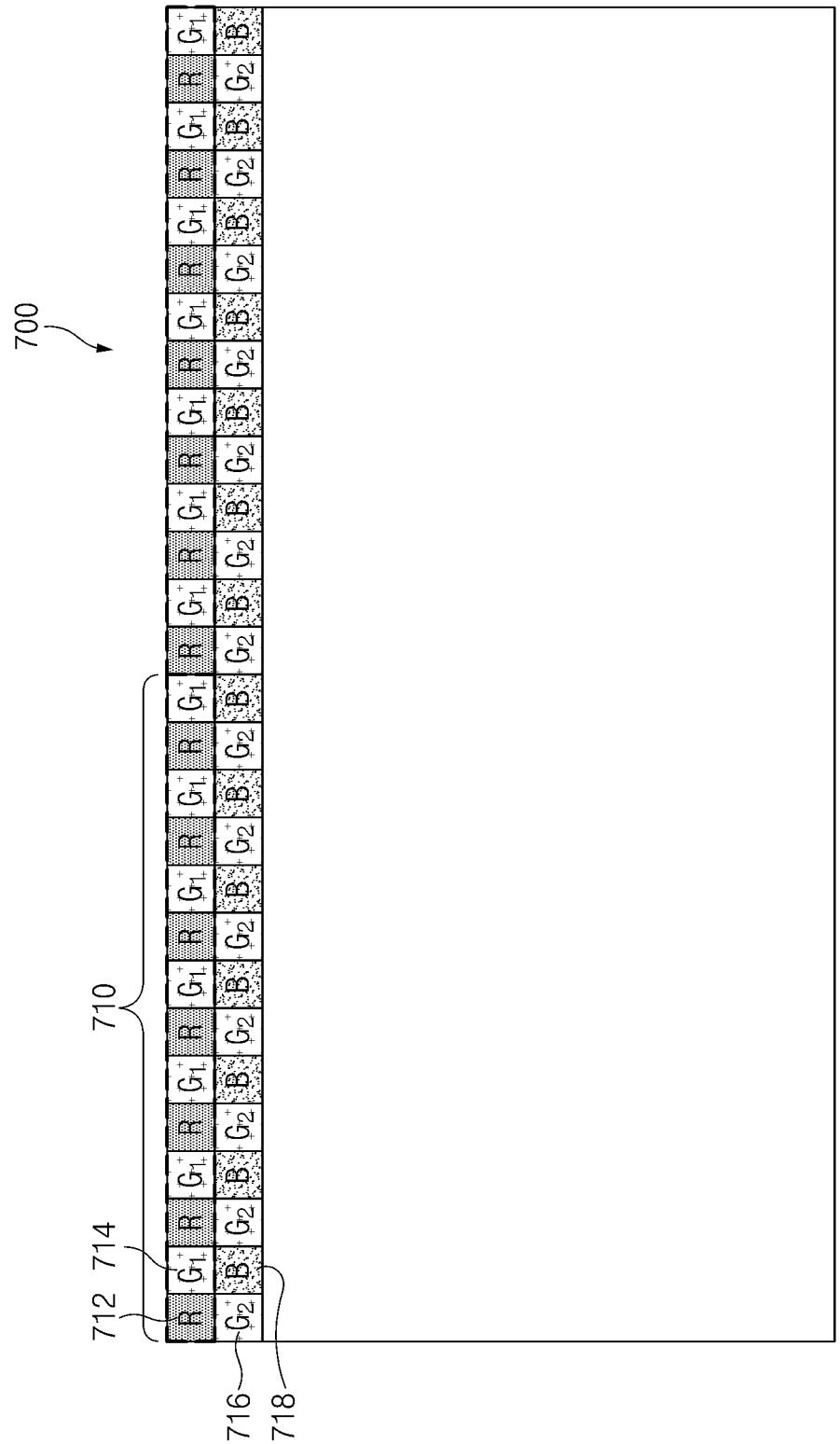
FIG. 7 is a view illustrating a partition according to various embodiments.

FIGS. 5 to 7 are views illustrating an operation of compressing attribute information by an electronic device according to various embodiments. FIGS. 5 to 7 illustrate an operation of compressing attribute information using run length encoding by an electronic device. Although FIGS. 5 to 7 illustrate an operation of compressing attribute information using run length encoding, the same principle may be applied to compress raw image data.

FIG. 6 is a block diagram illustrating an encoder according to various embodiments.

Referring to FIG. 6, the encoder 524 may be configured to compress attribute information by using run length encoding. The encoder 524 may include blocks 610 through 620. Each of blocks 610 through 620 may be a separate hardware configuration or module included in the encoder 524, or may be a respective operational flow implemented by the encoder 524.

In block 610, the encoder 524 may identify a run value for the bit values included in the attribute information based on the attribute information received from the correction circuit 522 and the size of a specified partition.

The partition may be composed of a plurality of pixel data included in image data. For example, referring to FIG. 7, image data 700 may include a plurality of lines. The pixel data 712 to 714 may be included in the first line, and the pixel data 716 to 718 may be included in the second line. The partition may include a specified number of pixel data in one line. For example, as shown in FIG. 7, a partition 710 may include 14 pixel data including pixel data 712 to 714. Although FIG. 7 illustrates image data 700 having a partition size (i.e., the number of pixel data) of 14, the partition size may be various corresponding to an implementation method. The size of the partition may be fixed or variable. The information representing the size of a partition may be included in a header area.

The encoder 524 may determine the run value by checking the first pixel value of the partition and then comparing the pixel values. The encoder 524 may determine the run value by performing a comparison operation by the number of pixel data included in the partition. The encoder 524 may insert information indicating the identified first pixel value into the header area. According to various embodiments, when the pixel values of the pixel data included in the partition are all the same, the encoder 524 may not generate a run value separately, and insert the information indicating that the pixel values of the pixel data included in the partition are all the same into the header area. When the image data is equally compressed for each bit plane, the encoder 524 may insert information indicating the number of partitions and bit planes having the same pixel value into the header area.

In block 620, the encoder 524 may binarize the identified run value. The encoder 524 may binarize the run value based on the binarization technique indicated by the index. The index may indicate a binarization technique to be performed by the encoder 524 among a plurality of binarization techniques. The binarization technique is, for example, at least one of kth-order Exp Golomb, Unary, Truncation Unary, Cut Unary+K-th index Golomb, Golomb rice.

For example, referring to FIG. 8, the encoder 524 may binarize the run value based on at least one of the techniques shown in Tables 810 through 830. Tables 810 through 820 may represent the k-th exponential Golomb technique. The prefix may mean information of indicating how many bits the suffix is. For example, referring to Table 810, when the prefix value is 1110, the prefix may mean that the suffix is represented by a 3-bit value, and when the prefix value is 111110, the prefix may mean that the suffix is represented by a 5-bit value. As another example, referring to Table 820, when the prefix value is 1110, the prefix may mean that the suffix is represented by a 5-bit value, and when the prefix value is 111110, the prefix may mean that the suffix is represented by a 7-bit value. The suffix may be determined based on a value range and the maximum value of the run value. The sum of the number of bits of the prefix and the number of bits of the suffix may be expressed as the number of bits. Table 830 may represent Cut Unary+0-th index Golomb of which the maximum value is '4'. For example, according to Table 830, four digits in the binary bit value (Bin String) may be determined by Truncation Unary technique, and the remaining digits may be determined by 0-th index Golomb technique.

As described above, according to various embodiments, an electronic device (e.g., the electronic device 1) may include a processor (e.g., the processor 20 or the ISP 150) and an image sensor module (e.g., the image sensor module 10), where the image sensor module includes an image sensor (e.g., the image sensor 110) and a control circuit electrically connected to the image sensor and connected to the processor through an interface, where the control circuit is configured to obtain raw image data through the image sensor, sense at least one pixel data included in the raw image data and at least one error data based on a difference between pixel values of the at least one pixel data and each of at least one other pixel data adjacent to the at least one pixel data, generate attribute information corresponding to the at least one error data, correct the at least one error data based on a specified scheme, compress the raw image data in which the at least one error data are corrected, and transmit the compressed raw image data and the attribute information to the processor.

According to an embodiment, the control circuit may be configured to generate flag data corresponding to a location of the at least one error data as at least a part of the attribute information. In addition, the control circuit may be configured to compress the attribute information in a specified compression scheme, and transmit the compressed attribute information to the processor. In addition, the control circuit may be configured to determine a run value corresponding to the at least one error data based on the attribute information, binarize the attribute information based on the determined run value, and compress the binarized attribute information. In addition, the control circuit may be configured to binarize the attribute information by using at least one of k-th-order exponential Golomb, unary, truncation unary, and Gollum rice techniques.

According to an embodiment, the processor may be configured to restore the compressed raw image data, and restore the corrected at least one error data based on the attribute information. In addition, the processor may be configured to correct the at least one error data based on the attribute information by using a scheme at least partially different from the specified scheme. In addition, the processor may include at least one of an application processor (AP) and an image signal processor (ISP).

As described above, according to various embodiments, an image sensor module (e.g., the image sensor module 10) may include an image sensor (e.g., the image sensor 110) that generates image data corresponding to light reflected or generated from a subject, a correction circuit (e.g., the correction circuit 522) that senses at least one pixel data included in the image data and at least one error data based on a difference between pixel values of the at least one pixel data and each of at least one other pixel data adjacent to the at least one pixel data, and corrects the at least one error data based on a specified scheme, an encoder (e.g., the encoder 524) that compresses the image data in which the at least one error data are corrected, and a transmitter (e.g., the transmitter 526) that transmits the compressed image data to a processor connected to the image sensor module through an interface.

According to an embodiment, the correction circuit may be configured to generate attribute information corresponding to the at least one error data, and the transmitter may be configured to transmit the attribute information to the processor. In addition, the correction circuit may be configured to generate flag data corresponding to a location of the at least one error data as at least a part of the attribute information.

According to an embodiment, the encoder may be configured to compress the attribute information and the transmitter may be configured to transmit the compressed attribute information to the processor. In addition, the encoder may be configured to identify a run value of the at least one error data, binarize the attribute information based on the run value, and compress the binarized attribute information. In addition, the encoder may include the correction circuit. In addition, the correction circuit may be configured to generate flag data corresponding to a location of the at least one error data as at least a part of the attribute information.

As described above, according to various embodiments, a processor (e.g., the processor 20) may be configured to receive raw image data including error data corrected by a control circuit (e.g., the control circuit 120) and compressed by the control circuit, and attribute information corresponding to the error data from the control circuit connected to the processor through an interface, and restore the compressed raw image data and the error data, where the error data are restored based on the attribute information and corrected in a specified correction scheme.

According to an embodiment, the specified correction scheme may be at least partially different from the correction scheme performed by the control circuit. According to an embodiment, the attribute information may include flag data corresponding to the location of the error data. According to an embodiment, the processor may be configured to receive the attribute information compressed by the control circuit from the control circuit and restore the compressed attribute information. The processor may include at least one of an AP and an ISP.

Figure 9:
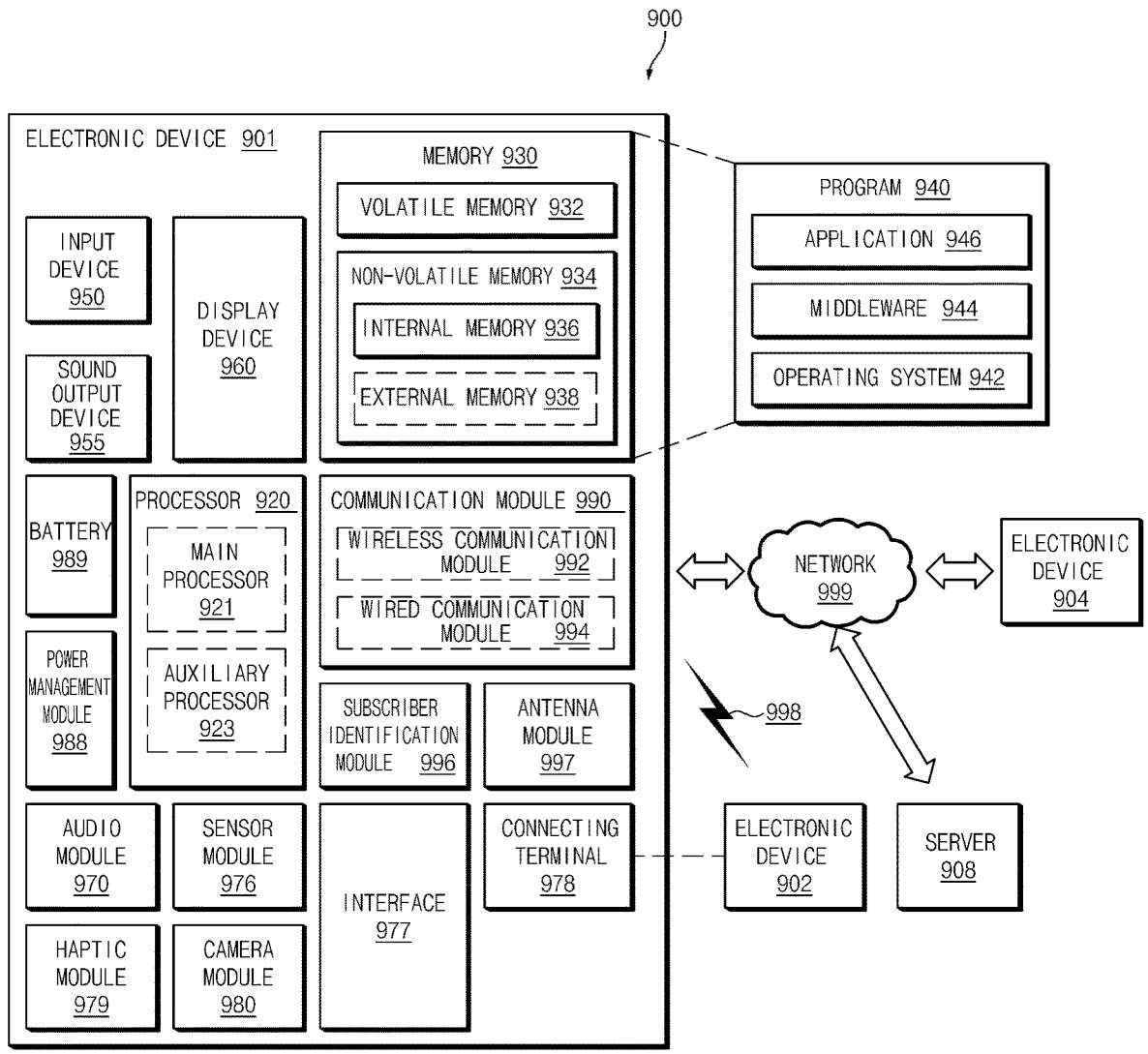
FIG. 9 is a block diagram of an electronic device for correcting error data of an image and compressing the corrected image in a network environment according to various embodiments.

FIG. 9 is a block diagram of an electronic device for correcting error data of an image and compressing the corrected image in a network environment according to various embodiments.

Referring to FIG. 1, in a network environment 900, an electronic device 901 (e.g., the electronic device 1) may communicate with an c through a first network 998 (e.g., local area wireless communication) or may communication with an electronic device 904 or a server 908 through a second network 999 (e.g., long range wireless communication). According to an embodiment, the electronic device 901 may communicate with the electronic device 904 through the server 908. According to an embodiment, the electronic device 901 may include a processor 920 (e.g. the processor 20), a memory 930, an input device 950, a display device 960, an audio module 970, a sensor module 976, an interface 977, a haptic module 979, a camera module 980, a power management module 988, a battery 989, a communication module 990, a subscriber identification module 996, and an antenna module 997. According to an embodiment, the electronic device 901 may not include at least one (e.g., the display device 960 or the camera module 980) of the above-described elements or may further include other element(s). According to an embodiment, for example, some components may be integrated and implemented as in the case of the sensor module 976 (e.g., a fingerprint sensor, an iris sensor, or an illuminance sensor) embedded in the display device 960 (e.g., a display).

For example, the processor 920 may drive software (e.g., a program 940) to control at least one other component (e.g., hardware or software components) of the electronic device 901 connected to the processor 920, and may perform various data processing and operations. The processor 920 may load a command or data, which is received from another element (e.g., the sensor module 976 or the communication module 990) to a volatile memory 932 to process the command or data and may store the result data in a nonvolatile memory 934. According to an embodiment, the processor 920 may include a main processor 921 (e.g., a central processing unit or an application processor), and an auxiliary processor 923 (e.g., a graphic processing device, an image signal processor (e.g., the ISP 150), a sensor hub processor, or a communication processor) which operates independently of the main processor 921 and additionally or alternatively uses less power than the main processor 921, or specialized for a specified function. In this case, the auxiliary processor 923 may be operated while being separated from or embedded in the main processor 921.

In this case, the auxiliary processor 923 may replace, for example, the main processor 921 while the main processor 921 is in an inactive (e.g., sleep) state, or may control a function related to at least one of the components (e.g., the display device 960, the sensor module 976, or the communication module 990) of the electronic device 901 together with the main processor 921 while the main processor 921 is in an active (e.g., application performing) state, or at least some of the states. According to an embodiment, the auxiliary processor 923 (e.g., an image signal processor or communication processor) may be implemented with some of other components (e.g., the camera module 980 or the communication module 990) functionally related. The memory 930 may store various data used by at least one component (e.g., the processor 920 or the sensor module 976) such as software (e.g., the program 940), and input data or output data for a command related thereto. The memory 930 may include the volatile memory 932 or the nonvolatile memory 934.

The program 940 is software stored in the memory 930, and may include, for example, an operating system 942, middleware 944, or an application 946.

The input device 950, which is a device for receiving an instruction or data to be used for a component (e.g., the processor 920) of the electronic device 901 from an outside (e.g., a user) of the electronic device 901, and may include, for example, a microphone, a mouse, or a keyboard.

The sound output device 955, which is a device for outputting an sound signal to an outside of the electronic device 901, and may include, for example, a speaker used only for general purposes such as multimedia playback or recording playback, and a receiver used only for telephone reception. According to an embodiment, the receiver may be formed integrally or separately from the speaker.

The display device 960, which is a device for visually providing information to a user of the electronic device 901, may include, for example, a display, a hologram device or a projector, and a control circuit for controlling a corresponding device. According to an embodiment, the display device 960 may include a touch circuitry or a pressure sensor for measuring an intensity of pressure on the touch.

The audio module 970 may convert from a sound into an electrical signal or from an electrical signal into a sound. According to an embodiment, the audio module 970 may acquire sound through the input device 950 or may output sound through an audio output device 955, or an external electronic device (e.g., the electronic device 902 (e.g., a speaker or a headphone)) wiredly or wirelessly connected with the electronic device 901.

The sensor module 976 may generate an electrical signal or a data value corresponding to an internal operating state (e.g., power or temperature) of the electronic device 901 or an external environment state. The sensor module 976 may include, for example, a gesture sensor, a gyro sensor, a barometric sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support a specified protocol capable of connecting with an external electronic device (e.g., the electronic device 902) by wire or wirelessly. According to an embodiment, the interface 977 may include a high definition multimedia interface (HDMI), a universal serial bus (USB) interface, a SD card interface, or an audio interface.

The connecting terminal 978 is a connector capable of physically connecting the electronic device 901 and an external electronic device (e.g., the electronic device 902), such as an HDMI connector, a USB connector, an SD card connector, or an audio connector (e.g., a headphone connector).

The haptic module 979 may convert an electrical signal into mechanical stimulation (e.g., vibration or motion) or electrical stimulation that can be perceived by the user through tactile or kinesthetic sensations. For example, the haptic module 979 may include, for example, a motor, a piezoelectric element, or an electric stimulator.

The camera module 980 may capture a still image and a moving picture. According to an embodiment, the camera module 980 may include at least one lens, an image sensor (e.g., the image sensor 110), an image signal processor (e.g., the ISP 150), or a flash.

The power management module 988, which is a module for managing the power of the electronic device 901, may be configured, for example, as at least a portion of a power management integrated circuit (PMIC).

The battery 989, which is a device for supplying power to at least one component of the electronic device 901, may include, for example, a non-rechargeable primary battery, a rechargeable secondary battery, or a fuel cell.

The communication module 990 may establish a wired or wireless communication channel between the electronic device 901 and an external device (e.g., the electronic device 902, the electronic device 904, or the server 908) and may support communication through the established communication channel. The communication module 990 may include one or more communication processors that support wired communication or wireless communication and operate independently of the processor 920 (e.g., an application processor). According to an embodiment, the communication module 990 may include a wireless communication module 992 (e.g., a cellular communication module, a s short-range wireless communication module, or a global navigation satellite system (GNSS) communication module) or a wired communication module 994 (e.g., a local area network (LAN) communication module, or a power line communication module), and may communicate with an external electronic device through the first network 998 (e.g., a short-range communication network such as Bluetooth, WiFi direct, or infrared data association (IrDA)) or the second network 999 (e.g., a wide area network such as a cellular network, the Internet, or a computer network (e.g., a LAN or a WAN)) by using a corresponding communication module of them. The various types of communication modules 990 described above may be implemented as one chip or each separate chip.

According to an embodiment, the wireless communication module 992 may distinguish and authenticate the electronic device 901 within a communication network by using user information stored in the subscriber identification module 996.

The antenna module 997 may include one or more antennas for transmitting or receiving a signal or power to or from an outside. According to an embodiment, the communication module 990 (e.g., the wireless communication module 992) may transmit a signal to or receive a signal from an external electronic device through an antenna suitable for a communication scheme.

Some of the components may be connected to each other through a communication scheme (e.g., a bus, a general purpose input/output (GPIO), a serial peripheral interface (SPI), or a mobile industry processor interface (MIPI)) between peripheral devices to exchange signals (e.g., commands or data) with each other.

According to an embodiment, the command or data may be transmitted or received between the electronic device 901 and the external electronic device 904 through the server 908 connected to the second network 999. Each of the electronic devices 902 and 904 may be the same or different type of device as the electronic device 901. According to an embodiment, all or some of operations executed in the electronic device 901 may be executed in another or a plurality of external electronic devices. According to an embodiment, when the electronic device 901 is required to perform a function or service automatically or by request, the electronic device 901 may request an external electronic device for at least some of the functions associated with the requested function or service instead of or in addition to executing the function or service by itself. Upon receiving the request, the external electronic device may execute the requested function or the additional function and transmit the result to the electronic device 901. The electronic device 901 may process the received results as it is or additionally to provide the requested function or service. To this end, for example, cloud computing, distributed computing, or client-server computing techniques may be used FIG. 10 is a block diagram of a camera module for correcting error data of an image and compressing a corrected image according to various embodiments.

Figure 10:
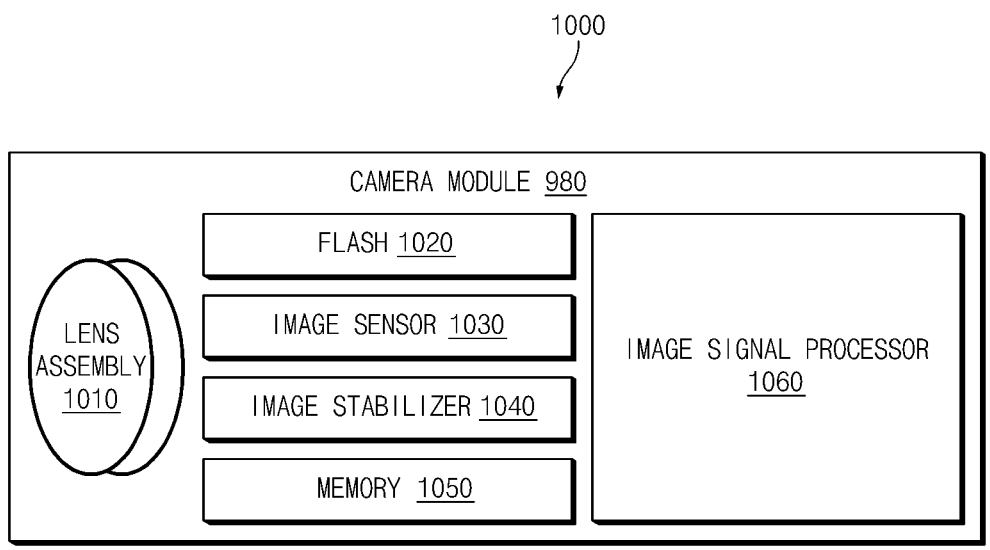
FIG. 10 is a block diagram of a camera module for correcting error data of an image and compressing a corrected image according to various embodiments.

Referring to FIG. 10, the camera module 980 may include a lens assembly 1010, a flash 1020, an image sensor 1030 (e.g., the image sensor 110), an image stabilizer 1040, and a memory 1050 (e.g., the buffer memory), or an image signal processor 1060 (e.g., the ISP 150). The lens assembly 1010 may collect light emitted from a subject that is a target of image capturing. The lens assembly 1010 may include one or more lenses. According to an embodiment, the camera module 980 may include the plurality of lens assemblies 1010. In this case, the camera module 980 may be, for example, a dual camera, a 360-degree camera, or a spherical camera. The plurality of lens assemblies 1010 may have the same lens properties (e.g., angle of view, a focal length, auto focus, f number, or an optical zoom), or at least one lens assembly may have at least one lens property different from those of the other lens assemblies. The lens assembly 1010 may include, for example, a wide angle lens or a telephoto lens. The flash 1020 may emit a light used to enhance the light emitted from a subject. The flash 1020 may include one or more light emitting diodes (e.g., red-green-blue (RGB) LEDs, white LEDs, infrared LEDs, or ultraviolet LEDs), or a xenon lamp.

The image sensor 1030 may obtain an image corresponding to the subject by converting the light received from the subject through the lens assembly 1010 into an electrical signal. According to an embodiment, the image sensor 1030 may include, for example, one image sensor selected from image sensors having different properties, such as an RGB sensor, a black and white (BW) sensor, an IR sensor, or a UV sensor, a plurality of image sensors having the same property, or a plurality of image sensors having different properties. Each image sensor included in the image sensor 1030 may be implemented with, for example, a charged coupled device (CCD) sensor or a complementary metal oxide semiconductor (CMOS) sensor.

The image stabilizer 1040 may control (e.g., adjusting read-out timing, and the like) to move at least one lens or image sensor 1030 included in the lens assembly 1010 in a specific direction in order to compensate at least in part for a negative effect (e.g., image shaking) due to the movement on the captured image in response to the movement of the camera module 980 or the electronic device 901 including the same. According to an embodiment, the image stabilizer 1040 may be implemented with, for example, an optical image stabilizer, and sense the movement by using a gyro sensor (not shown) or an acceleration sensor (not shown) arranged inside or outside the camera module 980.

The memory 1050 may at least temporarily store at least a portion of an image obtained through the image sensor 1030 for the purpose of the next image processing task. For example, when the image acquisition by the shutter is delayed, or a plurality of images are obtained at a high speed, the obtained raw image (e.g., a high resolution image) is stored in the memory 1050 and a corresponding copy thereof (e.g., a low resolution image) may be previewed through the display device 960. Thereafter, when a specified condition is met (e.g., a user input or a system command), at least a portion of the raw image stored in the memory 1050 may be obtained and processed by, for example, the image signal processor 1060. According to an embodiment, the memory 1050 may be configured as at least a portion of the memory 930 or a separate memory operated independently of the memory 930.

The image signal processor 1060 may perform image processing (e.g., depth map generation, three-dimensional modeling, panorama generation, feature point extraction, image synthesis, or image compensation (e.g., noise reduction, resolution adjustment, brightness adjustment, blurring, sharpening, or softening)) for an image acquired through the image sensor 1030 or an image stored in the memory 1050. Additionally or alternatively, the image signal processor 1060 may perform control (e.g., exposure time control, or read out timing control) for at least one (e.g., the image sensor 1030) of the components included in the camera module 980. The image processed by the image signal processor 1060 may be stored again in the memory 1050 for further processing or may be transmitted to an external component (e.g., the memory 930, the display device 960, the electronic devices 902 and 904, or the server 908) of the camera module 980. According to an embodiment, the image signal processor 1060 may be configured as at least a part of the processor 920, or may be configured as a separate processor operated independently of the processor 920. When the image signal processor 1060 is configured as a separate processor, the images processed by the image signal processor 1060 may be displayed through the display device 960 as it is or after additional image processing by the processor 920.

According to an embodiment, the electronic device 901 may include two or more camera modules 980 having different properties or functions. In this case, for example, at least one camera module 980 may be a wide angle camera or a front camera, and at least one other camera module may be a telescopic camera or a rear camera.

Figure 11:
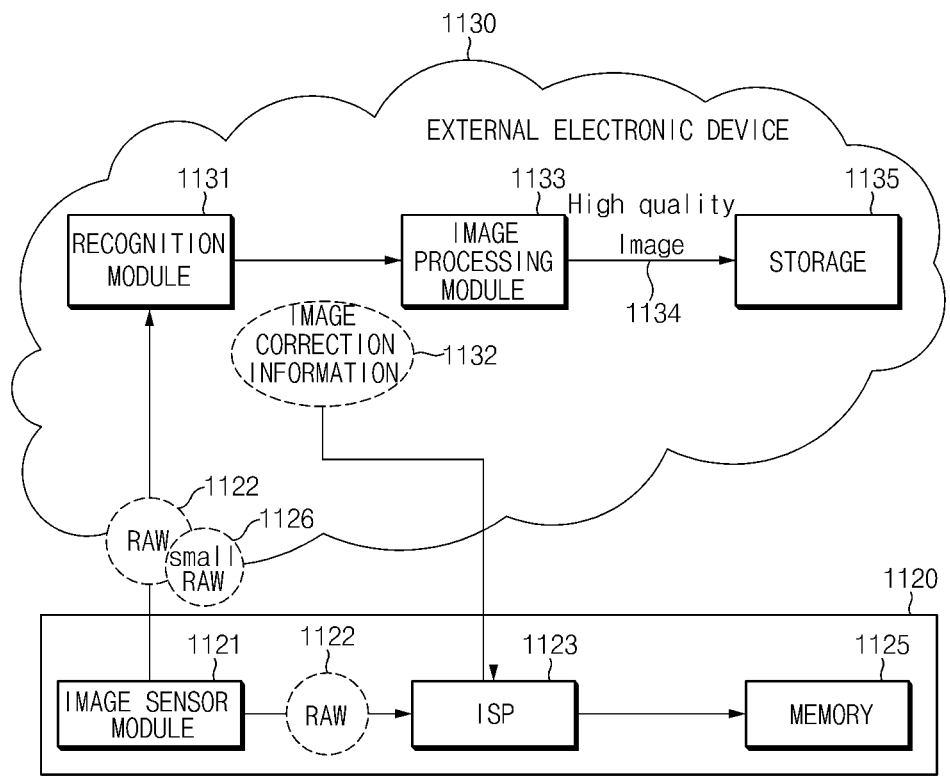
FIG. 11 is a block diagram illustrating an operation of an electronic device and an external electronic device according to various embodiments. With regard to description of drawings, similar elements may be marked by similar reference numerals.

FIG. 11 is a block diagram illustrating an operation of an electronic device and an external electronic device according to various embodiments.

Referring to FIG. 11, an electronic device 1120 (e.g., the electronic device 1 or the electronic device 101) may include an image sensor module 1121 (e.g., the image sensor module 10) and an ISP 1123 (e.g., the processor 20 or the ISP 150), and a memory 1125. An external electronic device 1130 (e.g., the electronic device 904, the server 908, or the electronic device 902) may include a recognition module 1131, an image processing module 1133, and storage 1135. The recognition module 1131 may be a logic module or may be implemented with a processor of the external electronic device 1130. The image processing module 1133 may be implemented with a processor of the external electronic device 1130. For example, the processor of the external electronic device 1130 may perform both recognition and image processing. Although not illustrated in FIG. 11, the electronic device 1120 may include a communication module (e.g., the interface 977 or the communication module 990) that may transmit and receive data to or from the external electronic device 1130. The external electronic device 1130 may include a communication module capable of transmitting and receiving data to or from the electronic device 1120.

According to an embodiment, the image sensor module 1121 (e.g., the control circuit 120) may obtain an image of an external object, and generate a raw image 1122 (which may be referred to as raw image data) corresponding to the obtained image. The image sensor module 1121 may transfer the raw image 1122 to the ISP 1123. In various embodiments of the disclosure, the image sensor module 1121 may generate a small raw image 1126 and transmit the generated small raw image to the external electronic device 1130 through the communication module. In other embodiments, a processor (e.g., the processor 20, the ISP 150, the processor 920, or the auxiliary processor 923) of the electronic device 1120, rather than the image sensor module 1121, may generate the small raw image 1126 may transmit the generated small raw image 1126 to the external electronic device 1130 through the communication module. The image sensor module 1121 may process at least a part of the raw image 1122, or compress at least a part of the raw image 1122 to be transmitted to an outside (e.g., the processor 20, the ISP 1123, or the external electronic device 1130). The image sensor module 1121 may transmit the compressed raw image to the ISP 1123 or the external electronic device 1130 (e.g., the image processing module 1133). According to an embodiment, the ISP 1123 (e.g., the processor 20 or the ISP 150) may transmit the raw image 1122, the compressed raw image, or the small raw image received from the image sensor module 1121 to the external electronic device 1130. The image sensor module 1121 may compress a part of the raw image 1122, and temporarily store a part of the compressed raw image 1122 in a memory inside the image sensor module 1121.

According to an embodiment, the recognition module 1131 may obtain the small raw image 1126 through a communication module, and segment at least one image area from the small raw image 1126. The recognition module 1131 may recognize each of at least one divided image area by performing segmentation. According to an embodiment, image correction information 1132, which includes at least one of information (e.g., coordinate information of an image area or a recognition result) associated with a plurality of image areas generated from the recognition module 1131, may be generated. The image correction information 1132 may be transmitted to the electronic device 1120. The ISP 1123 may generate the corrected image by correcting the raw image 1122 using the image correction information 1132. For example, the corrected image may have a format of YUV. The corrected image may be stored in the memory 1125. As another example, the corrected image may be compressed according to the Joint Photographic Experts Group (JPEG) standard, and the compressed image may be stored in the memory 1125.

According to an embodiment, the raw image 1122 generated by the image sensor module 1121 may be transmitted to the external electronic device 1130 separately from the small raw image 1126. For example, because the raw image 1122 has a larger capacity than the small raw image 1126, the small raw image 1126 may be preferentially transmitted to the external electronic device 1130, and then the raw image 1122 may be transmitted to the external electronic device 1130. As still another embodiment, the raw image 1122 may be transmitted to the external electronic device 1130 while the ISP 1123 performs correction on the raw image 1122. The raw image 1122 may be uploaded to the external electronic device 1130 as generated by the image sensor module 1121, or the preprocessed image in which lens distortion compensation or noise removal is performed may be uploaded. The preprocessing may be performed by the external electronic device 1130. The external electronic device 1130 may perform demosaic processing, image format modification, or preprocessing for increasing an image recognition rate.

According to an embodiment, the image processing module 1133 of the external electronic device 1130 may correct the received raw image 1122. The external electronic device 1130 may correct the raw image 1122 by using the previously generated image correction information 1132, or may correct the raw image 1122 by using extended image correction information. Because the raw image 1122 may have a higher resolution than the small raw image 1126, the image processing module 1133 of the external electronic device 1130 may obtain more extended image correction information from a high resolution image. The image processing module 1133 may generate the extended image correction information by using the previously generated image correction information and the raw image 1122 together. The image processing module 1133 may obtain a high quality image 1134 by correcting the raw image 1122 using the extended image correction information. The high quality image 1134 may be stored in the storage 1135 of the external electronic device 1130 or may be downloaded by the electronic device 1120.

According to various embodiments, the small raw image 1124 refers to a raw image having a size smaller than the data size of the raw image 1122, and is not limited to an image generated by a specific format or a specific scheme. For example, the small raw image 1124 may be generated by reducing the capacity of the raw image 1122. The small raw image 1124 may be referred to as a lightweight image. For example, the electronic device 1120 may generate the small raw image 1124 by applying various down-scale or down-sampling schemes to the raw image 1122. For example, the electronic device 1120 may perform at least one of the resolution adjustment of the raw image 1122, the selection of at least some from a plurality of frequency bands, or the selection of at least one from a plurality of bit plane levels, thereby generating the small raw image 1124 having a size smaller than the size of the data of the raw image 1122. The electronic device 1120 may generate the small raw image 1124 by, for example, extracting a low frequency band from the raw image 1122. The electronic device 1120 may generate the small raw image 1124, for example, by selecting bit plane levels of some of the plurality of bit plane levels of the raw image 1122. The small raw image 1124 may include at least a piece of information about the raw image 1122 and may be an image having a smaller capacity than the raw image 1122. When the small raw image 1124 is transmitted to the external electronic device 1130 instead of the raw image 1122, data of a smaller capacity are transmitted, so that the image may be more quickly transmitted to the external electronic device 1130.

An electronic device according to various embodiments of the disclosure may include various forms of devices. For example, the electronic device may include at least one of a portable communication device (e.g., a smartphone), a computer device, a portable multimedia device, a portable medical device, a camera, a wearable device, or a home electronic appliance. The electronic device according to an embodiment of this disclosure may not be limited to the above-described devices.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., a computer). The machine, which invokes an instruction stored in the storage medium and is operable according to the invoked instruction, may include an electronic device (e.g., the electronic device 901 or 1) according to the embodiments. When the instruction is executed by a processor (e.g., the processor 920 or 20), the processor may perform the function corresponding to the instruction directly or by using other elements under control of the processor. The instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
an image signal processor (ISP); and
an image sensor module,
wherein the image sensor module includes:
an image sensor;
a correction circuit for correcting image data obtained through the image sensor;
an encoder; and
a transmitter,
wherein the image sensor is configured to obtain raw image data,
wherein the correction circuit is configured to:
sense at least one pixel data included in the raw image data and at least one error data based on a difference between pixel values of the at least one pixel data and each of a plurality of other pixel data adjacent to the at least one pixel data,
generate attribute information corresponding to the at least one error data, and
correct the at least one error data based on a specified scheme,
wherein the encoder is configured to compress the raw image data in which the at least one error data are corrected, and
wherein the transmitter is configured to transmit the compressed raw image data and the attribute information to the image signal processor.

2. The electronic device of claim 1, wherein the correction circuit is configured to generate flag data corresponding to a location of the at least one error data as at least a part of the attribute information.

3. The electronic device of claim 1, wherein the image signal processor is configured to:
restore the compressed raw image data, and
restore the corrected at least one error data based on the attribute information.

4. The electronic device of claim 1, wherein the image signal processor is configured to correct the at least one error data based on the attribute information by using a scheme at least partially different from the specified scheme.

5. The electronic device of claim 1, wherein the specified scheme includes the steps of:
select a plurality of pixel pairs from the plurality of other pixel data adjacent to the at least one pixel data,
calculate a difference in pixel value for each of the plurality of pixel pairs,
select a pixel pair in the plurality of pixel pairs having a smallest difference,
calculate an average pixel value for the selected pixel pair, and
replace the pixel value of the at least one pixel data with the average pixel value.

6. The electronic device of claim 1, wherein the correction circuit is configured to:
compress the attribute information in a specified compression scheme, and
transmit the compressed attribute information to the image signal processor.

7. The electronic device of claim 6, wherein the correction circuit is configured to:

determine a run value corresponding to the at least one error data based on the attribute information, binarize the attribute information based on the determined run value, and compress the binarized attribute information.

8. The electronic device of claim 7, wherein the correction circuit is configured to binarize the attribute information by using at least one of k-th-order exponential Golomb, unary, truncation unary, and Gollum rice techniques.

9. An image sensor module comprising:
   an image sensor configured to generate image data corresponding to light reflected or generated from a subject;
   a correction circuit configured to sense at least one pixel data included in the image data and at least one error data based on a difference between pixel values of he at least one pixel data and each of a plurality of other pixel data adjacent to the at least one pixel data, and correct the at least one error data based on a specified scheme;
   an encoder configured to compress the image data in which the at least one error data are corrected; and
   a transmitter configured to transmit the compressed image data to an image signal processor connected to the image sensor module through an interface.

10. The image sensor module of claim 9, wherein the encoder includes the correction circuit.

11. The image sensor module of claim 9, wherein the correction circuit is configured to generate attribute information corresponding to the at least one error data, and
   wherein the transmitter is configured to transmit the attribute information to the image signal processor.

12. The image sensor module of claim 11, wherein the correction circuit is configured to generate flag data corresponding to a location of the at least one error data as at least a part of the attribute information.

13. The image sensor module of claim 11, wherein the encoder is configured to compress the attribute information,
   wherein the transmitter is configured to transmit the compressed attribute information to the image signal processor.

14. The image sensor module of claim 13, wherein the encoder is configured to:
   identify a run value of the at least one error data,
   binarize the attribute information based on the run value, and
   compress the binarized attribute information.

* * * * *